United States Patent
Arimitsu et al.

(10) Patent No.: US 6,924,610 B2
(45) Date of Patent: Aug. 2, 2005

(54) DRIVING METHOD AND SYSTEM FOR ELECTRICAL ROTATING MACHINE HAVING TWO ROTORS USING COMPOUND CURRENT

(75) Inventors: Minoru Arimitsu, Kanagawa (JP); Shouichi Maeda, Kanagawa (JP)

(73) Assignee: Nissan Motor Co., Ltd., Yokohama (JP)

( * ) Notice: Subject to any disclaimer, the term of this patent is extended or adjusted under 35 U.S.C. 154(b) by 228 days.

(21) Appl. No.: 10/400,384

(22) Filed: Mar. 28, 2003

(65) Prior Publication Data

US 2003/0193253 A1 Oct. 16, 2003

(30) Foreign Application Priority Data

Apr. 1, 2002 (JP) ........................................ 2002-098246

(51) Int. Cl.⁷ .............................................. H02K 23/00
(52) U.S. Cl. ..................... 318/254; 318/138; 318/439; 318/801
(58) Field of Search ................................. 318/254, 138, 318/439, 801; 310/191, 156.53

(56) References Cited

U.S. PATENT DOCUMENTS

| | | | |
|---|---|---|---|
| 6,049,152 A | 4/2000 | Nakano et al. | |
| 6,384,567 B1 | 5/2002 | Maeda | |
| 2001/0020805 A1 | 9/2001 | Nakano et al. | |
| 2002/0117927 A1 * | 8/2002 | Kim et al. | 310/191 |
| 2002/0172599 A1 * | 11/2002 | Ojima et al. | 417/44.11 |

FOREIGN PATENT DOCUMENTS

| | | |
|---|---|---|
| EP | 1 109 306 A2 | 6/2001 |
| EP | 1 180 446 A2 | 2/2002 |
| JP | 2-72662 | 6/1990 |
| JP | 5-60170 U | 8/1998 |
| JP | 11-356015 A | 12/1999 |
| JP | 2001-157487 A | 6/2001 |
| JP | 2001-231227 A | 8/2001 |
| JP | 2001-309631 A | 11/2001 |

OTHER PUBLICATIONS

U.S. Appl. No. 10/400,497, filed Mar. 28, 2003, Arimitsu.
U.S. Appl. No. 10/400,509, filed Mar. 28, 2003, Akatsu.
U.S. Appl. No. 10/337,898, filed Jan. 8, 2003, Arimitsu.
U.S. Appl. No. 10/361,559, filed Feb. 11, 2003, Arimitsu.

* cited by examiner

*Primary Examiner*—Karen Masih
(74) *Attorney, Agent, or Firm*—Foley & Lardner LLP

(57) ABSTRACT

In driving method and system for an electrical rotating machine, the electrical rotating machine comprising two rotors, each rotor being independently driven by means of a compound current generated by a multi-phase inverter, and a stator on which a plurality of stator coils are wound, the respective stator coils are divided into a plurality of groups thereof, a total current sum of each group thereof being zeroed and neutral points of the stators belonging to the respective groups being interconnected and drive pulses are supplied to a plurality of inverter arms of the inverter associated with one group of the stator coils independently of those supplied to other inverter arms of the inverter associated with the other group of the stator coils.

13 Claims, 8 Drawing Sheets

DRIVING METHOD AND SYSTEM FOR ELECTRICAL ROTATING MACHINE HAVING TWO ROTORS USING COMPOUND CURRENT

BACKGROUND OF THE INVENTION

1. Field of the Invention

The present invention relates to driving method and system for driving an electrical rotating machine having two rotors, one of the two rotors being driven independently of the other rotor by means of a compound current.

2. Description of the Related Art

A Japanese Patent Application First Publication No. Heisei 11-356015 published on Dec. 24, 1999 exemplifies a previously proposed electrical rotating machine of a three-layer structure having two rotors and a single common stator. A compound (alternating) current which is a sum of sinusoidal waves is caused to flow through a coil of the stator of the previously proposed electrical rotating machine from an (two-level) inverter. An inverter to drive the respective rotors is assigned to be a multi-phase inverter. A neutral point of an armature coil (stator coil) is generally a single. Such an electrical rotating machine as described above can be used to a vehicle such as a hybrid vehicle.

SUMMARY OF THE INVENTION

In a case where such a multi-phase inverter as described above is driven in a PWM (Pulse Width Modulation) method, a phase deviation between carrier frequencies occurs. This phase deviation causes an un-match between gate drive pulses of a power semiconductor device constituting the multi-phase (for example, twelve phases) inverter, thus unnecessary currents being caused to flow through a stator coil. Therefore, every phase of the carrier frequency and a target current value are demanded to be generated at exactly the same timing. However, if a general-purpose microcomputer is used for driving the multi-phase inverter, only triangular wave comparing portion peripherals corresponding to three phases at maximum are provided. Therefore, it is necessary to make clock frequencies of a plurality of microcomputers mutually the same and even to make each of timings at which the target current value is retrieved exactly the same.

As a result of this, an exclusively used triangular wave comparing peripheral is needed to be prepared. A total manufacturing cost is, hence, increased. Furthermore, if the peripheral portion needed to cope with the multi-phase inverter is assembled by an exclusively usable logic IC (Integrated Circuit) or gate array, the manufacturing cost would furthermore be augmented if an operation under a strict environment such as a temperature compensation range of a vehicle is guaranteed.

It is, hence, an object of the present invention to provide driving method and system for an electrical rotating machine having two rotors using the compound current which are capable of taking a mutual synchronization between the drive pulses with easiness and realizable at a relatively low manufacturing cost.

According to one aspect of the present invention, there is provided with a driving method for an electrical rotating machine, the electrical rotating machine comprising two rotors, each rotor being independently driven by means of a compound current generated by a multi-phase inverter, and a stator on which a plurality of stator coils are wound, the driving method comprising: dividing the respective stator coils into a plurality of groups thereof, a total current sum of each group thereof being zeroed and neutral points of the stators belonging to the respective groups being interconnected; and supplying drive pulses to a plurality of inverter arms of the multi-phase inverter associated with one group of the stator coils independently of those supplied to other inverter arms of the inverter associated with the other group of the stator coils.

According to another aspect of the present invention, there is provided with a driving system for an electrical rotating machine, the electrical rotating machine comprising two rotors, each rotor being independently driven by means of a compound current generated by a multi-phase inverter, and a stator on which a plurality of stator coils are wound, the driving system comprising: a dividing section that divides the respective stator coils into a plurality of groups thereof, a total current sum of each group thereof being zeroed and neutral points of the stators belonging to the respective groups being interconnected; and a drive pulse supplying section that supplies drive pulses to a plurality of inverter arms of the multi-phase inverter associated with one group of the stator coils independently of those supplied to other inverter arms of the multi-phase inverter associated with the other group of the stator coils.

This summary of the invention does not necessarily describe all necessary features so that the invention may also be a sub-combination of these described features.

DETAILED DESCRIPTION OF THE PREFERRED EMBODIMENT

Reference will hereinafter be made to the drawings in order to facilitate a better understanding of the present invention.

Figure 1:
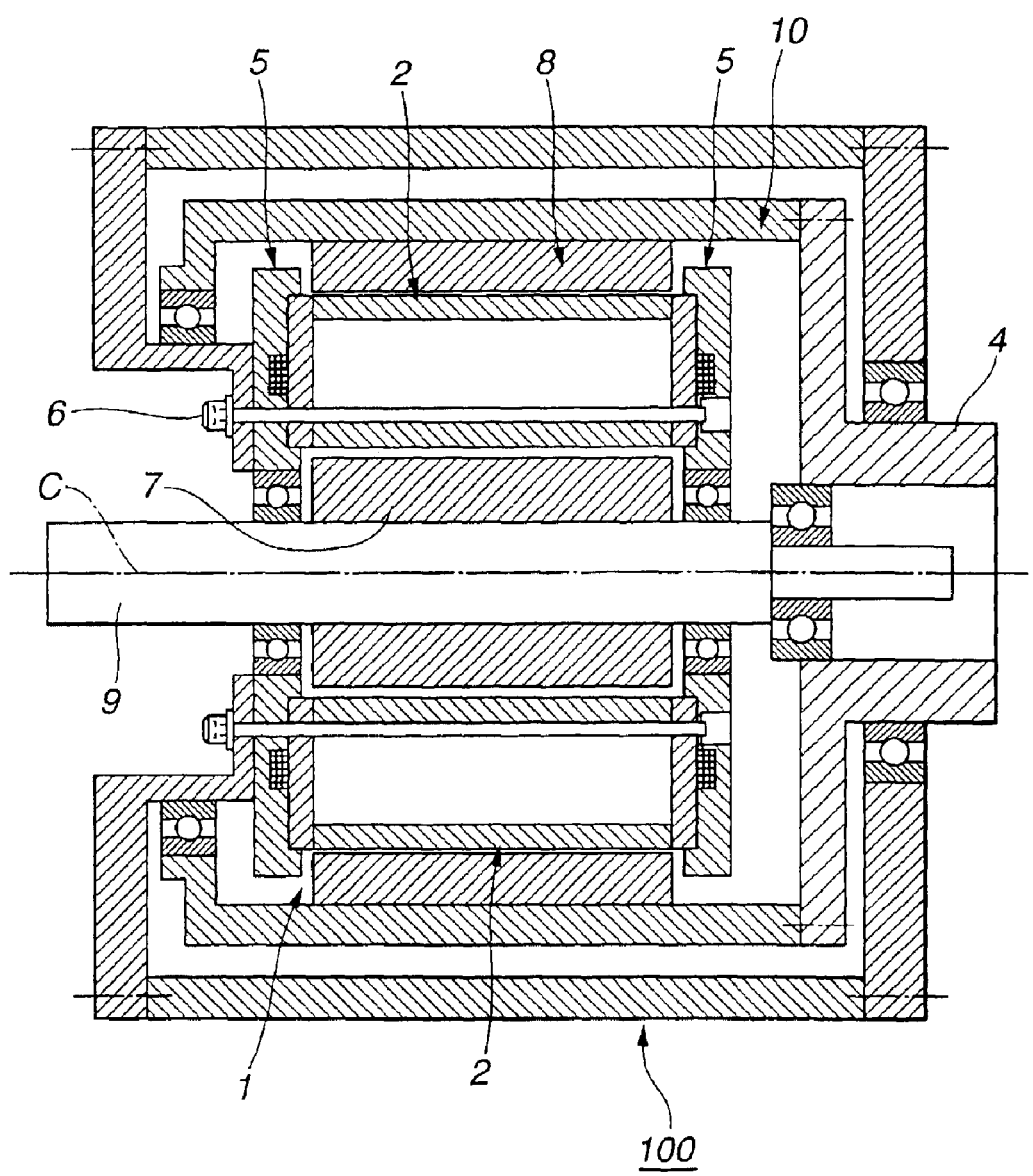
FIG. 1 is a cross sectional view of an example of an electrical rotating machine to which a driving method according to the present invention is applicable.

FIG. 1 shows across sectional view of an electrical rotating machine which can be driven by means of a compound current using a drive system for the electrical rotating machine according to the present invention.

Electrical rotating machine 100 is formed in a multiplex rotor structure having an inner rotor 7 attached onto an inner rotor shaft 9 concentrically on a center axis line C of inner rotor shaft 9 (also serves as a center axis line of the whole electrical rotating machine 100), a stator 1, and an outer rotor 8 attached onto outer rotor shaft 10, in this order from an inside of electrical rotating machine 100.

Stator 1 interposed between outer rotor 8 and inner rotor 7 is provided with stator core 2 and brackets 5 supporting stator core 2 so as to be grasped thereby from both sides in the axial direction. Bolts 6 are penetrated through holes installed on brackets 5 and stator core 2 so as to fix these members to form stator 1. Stator core 2 is divided into a plurality of stator pieces disposed in a peripheral direction, a coil L being wound on each stator piece. Each stator piece is formed by laminating a plurality of stator steel plates. Permanent magnets are attached onto inner rotor 7 and outer rotor 8. With the rotating machine in which two rotors 7 and 8 driven independently by means of a compound current (AC) are coaxially arranged as an example of application of the driving method, the driving method and system according to the present invention will be described below.

Figure 2A:
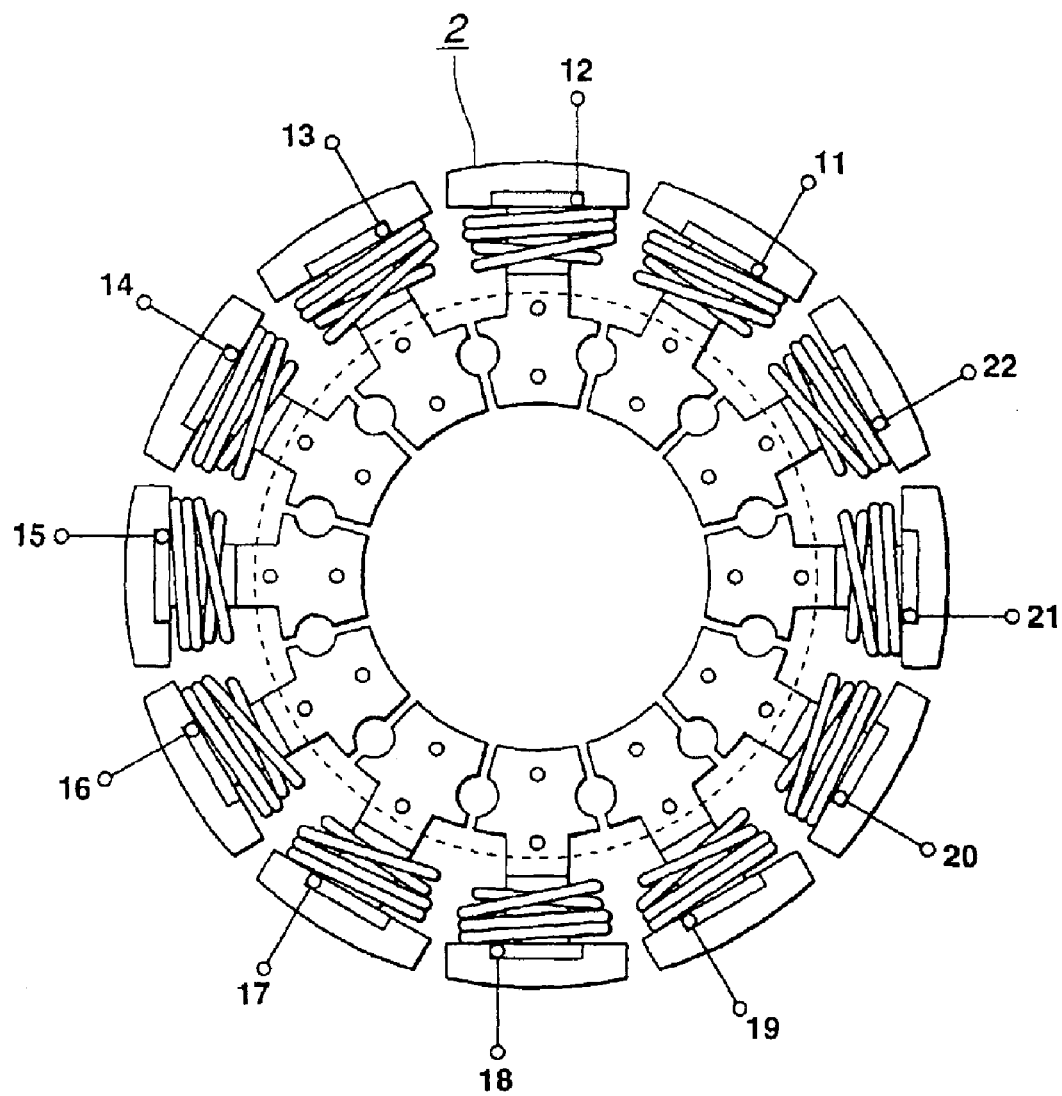
FIGS. 2A, 2B, and 2C are an example of connections of stator coils of the electrical rotating machine shown in FIG. 1 from feeders derived from inverter arms in the case of the driving method according to the present invention.
Figure 2B:
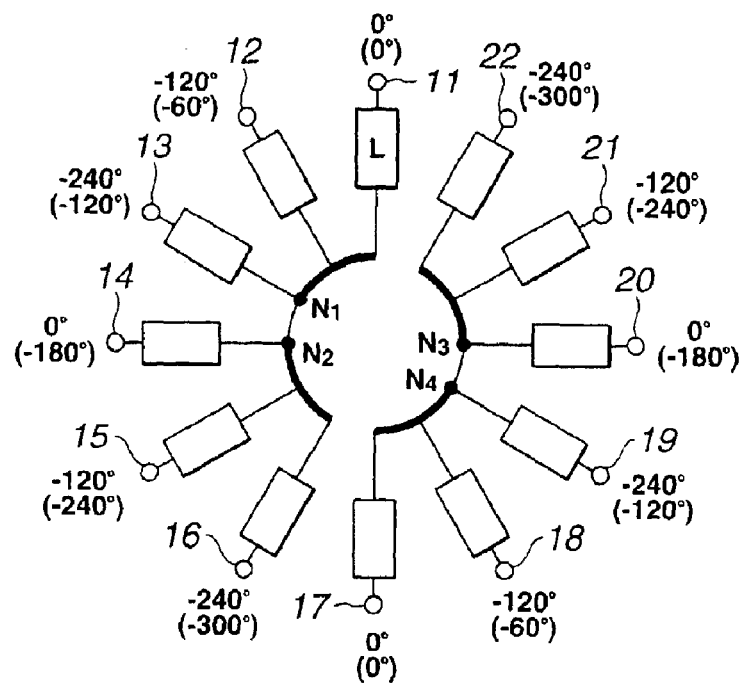
Figure 2C:
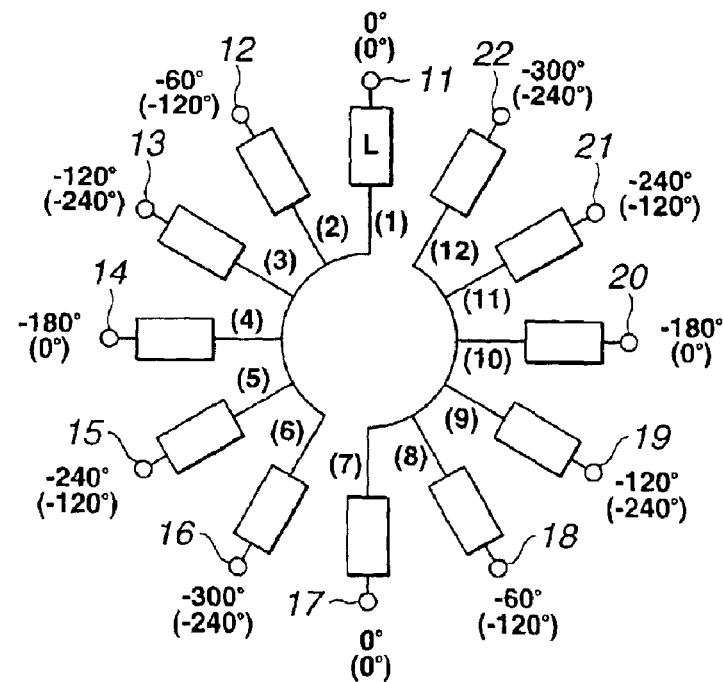

FIG. 2A shows an example of connections of feeders to stator coils L of electrical rotating machine 100 shown in FIG. 1. In this example, outer rotor 8 constitutes three-phase, four pole pair configuration and inner rotor 7 constitutes six-phase, two pole pair configuration (as will be described later). Each stator coil L (refer to FIG. 2B) is connected to a twelve-phase inverter via feeders 11 through 22, viz., an inverter INV having switching transistors (for example, IGBT (Insulated Gate Bipolar Transistors) of twelve pairs. Number of feeders connected to stator coils are, as a total in this example, twelve from a reference numeral 11 to a reference numeral 22 as shown in FIGS. 2B and 2C. At this time, a phase of the current passing through each feeder is described as shown in TABLE 1. In a case where the current having the phases described in TABLE 1 is supplied from the inverter to each stator coil shown in FIG. 2A via feeders 11 through 22, a total of twelve, viz., 24 drive pulses in both positive and negative directions (PN) are needed to be held synchronized. Hence, a circuit by which 24 (twenty-four) drive pulses are needed to be synchronized with each other. In addition, to maintain the synchronization, it is necessary to prepare the drive pulses with a wiring (connection) pattern taken into consideration. Consequently, a high-quality printed circuit board is needed to be used. Hence, it takes a lot of manufacturing cost. On the other hand, in the driving method according to the present invention, the feeders 11 through 22 described in TABLE 1 derived from the inverter to stator coils L are grouped into two, each group having a zero total current sum. Since, in the above-described example with reference to TABLE 1, each current total sum of both of a stator coil group connected to feeders of 11 through 16 and another stator coil group connected to the feeder of 17 through 22 is zero, neutral points are separated into two (refer to FIG. 2B). Hence, no electrical problem occurs even if drive pulses for the group of feeders 11 through 16 and for the other group of feeders 17 through 22 are independently generated. Hence, the number of drive pulses that the synchronization of pulse generation with each other is needed to be taken are reduced by half as compared with the previously proposed driving method described above. Since a more high-density actual mounting can be achieved, it becomes easy to take the synchronization described above even if a low-cost printed circuit board is used.

Figure 3A:
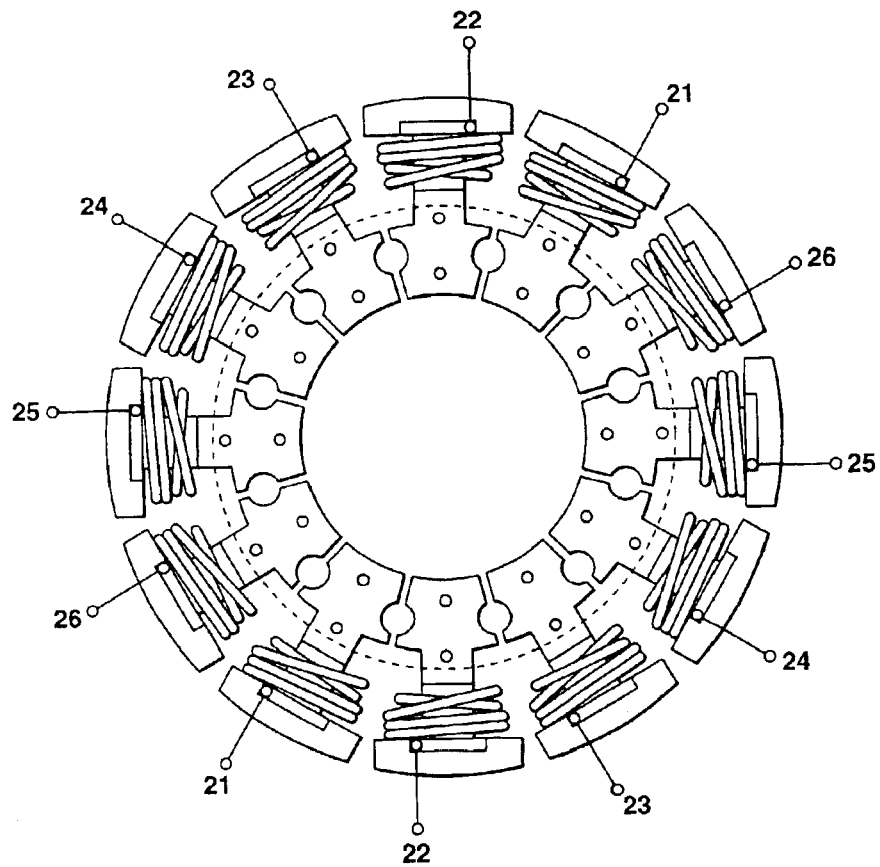
FIGS. 3A and 3B are another example of connections of the stator coils of the electrical rotating machine shown in FIG. 1 from feeders derived from inverter arms in the case of the driving method according to the present invention.
Figure 3B:
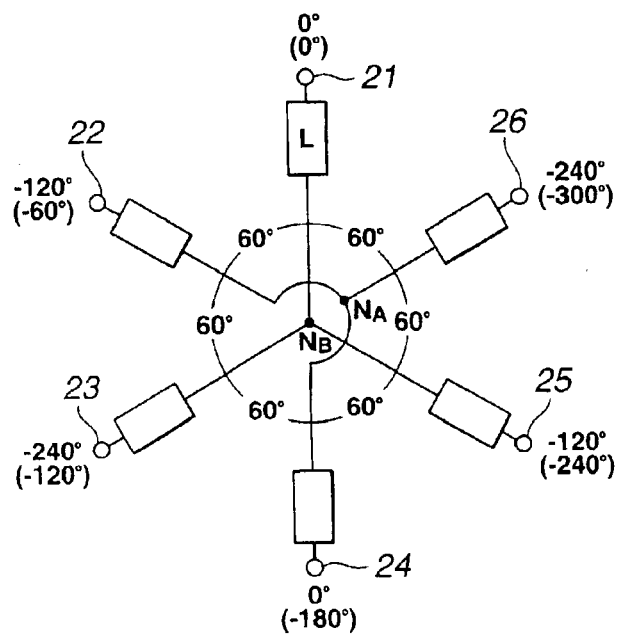

Next, FIG. 3A shows another example of connections of feeders 21 through 26 to stator coils of electrical rotating machine shown in FIG. 1. In this example, rotating machine 100 constitutes outer rotor 8 of three-phase, two pairs of pole configuration and inner rotor 7 of six-phase, one pair of pole configuration. FIG. 3B shows an electrical connection of stator coils L both in outer rotor three-phase two pair of pole configuration and inner rotor six-phase one pair of pole configurations. It is noted that, although the same numbered feeders 21 through 26 are provided in FIG. 3A, the stator coils related to the same numbered feeders are serially connected to form a single stator coil as will described later. Then, stator coils are connected to a six-phase inverter, in this example, via six feeders 21 through 26. The phases of the current flowing through the respective feeders 21 through 26 are described as shown in TABLE 2.

Since the total current sum of a group of stator coils related to feeders of 21, 23, and 25 and that of another group of stator coils related to feeders 22, 24, and 26 are respectively zeroed, no electrical problem occurs even if the neutral points are separated (refer to FIG. 3B). The number of the drive pulses needed to take the synchronization are three (six in the positive and negative directions (PN)). This is achieved by a generally available three-phase inverter.

Figure 4A:
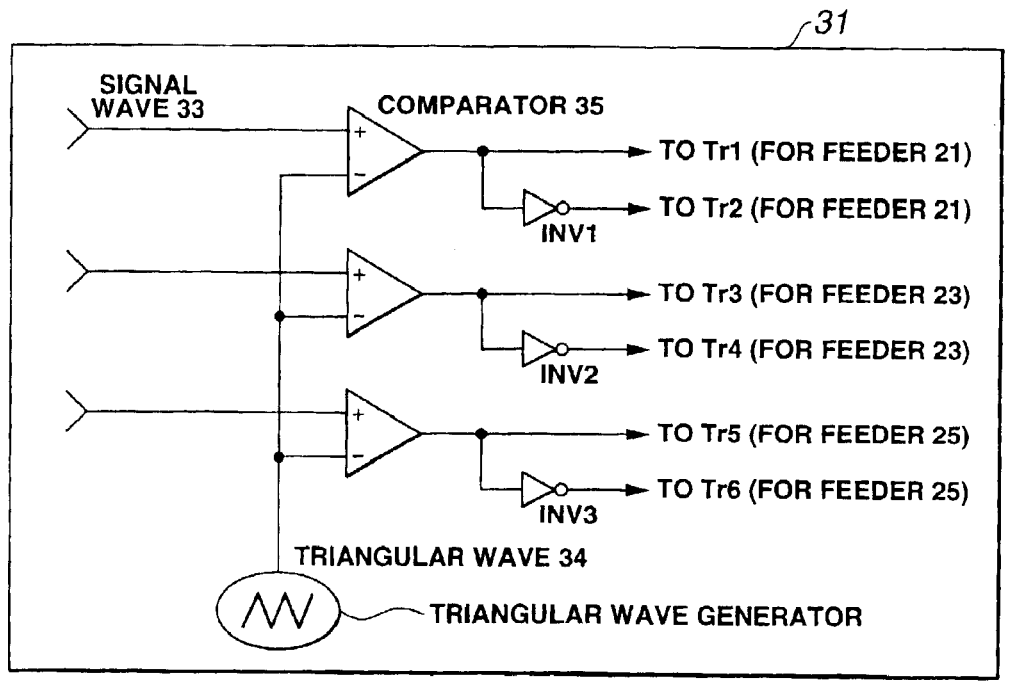
FIGS. 4A and 4B are circuit block diagrams of respective drive pulse generators (or PWM pulse generators) in the case of the driving method according to the present invention.
Figure 4B:
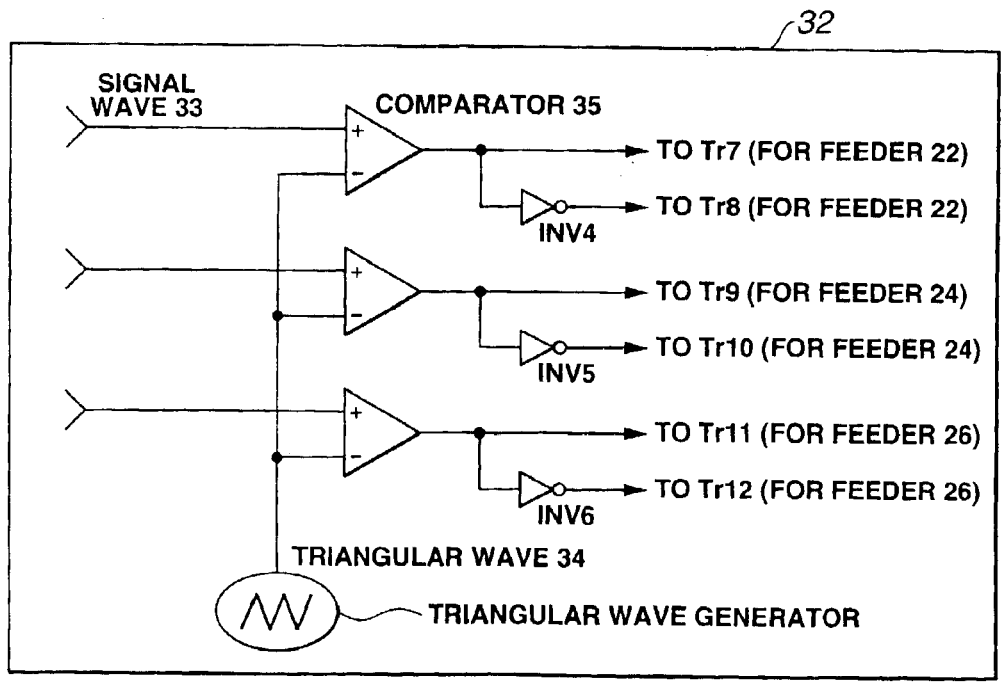

FIGS. 4A and 4B show circuit block diagrams of drive pulse generators 31 and 32 (PWM wave generators) usable in the latter example shown in FIGS. 3A and 3B. It is noted that, as described above, connections from drive pulse generators 31 and 32 (or called, PWM (Pulse Width Modulation) wave pulse generators) to the stator coils correspond to the latter example shown in FIG. 3A. Drive pulse generator 31 shown in FIG. 4A is associated with feeders 21, 23, and 24 shown in FIGS. 3A and 3B and drive pulse generator 32 shown in FIG. 4B is associated with feeders 22, 24, and 26 shown in FIGS. 3A and 3B. Drive pulse generator 31 generates the drive pulse by comparing a signal wave 33 (PWM modulated wave) with a triangular wave 34 (PWM modulation wave) from a triangular wave generator at each comparator 35. Each comparator 35 has two input ends, one input end being an inverting end to which triangular wave is inputted and another input end having a non-inverting input end to which each of signal waves 33 is inputted and one output end connected to one of inverter arms of multi-phase inverter INV (refer to FIG. 5B) related feeders 21, 23, and 25. Drive pulse generator 32 has the same structure as in the case of drive pulse generator 31 shown in FIG. 4A. It is noted that the output end of each comparator 35 is provided with each inverter INV1 through INV3 to invert an output voltage level of the corresponding one of comparators 35 to supply the inverted output voltage level to a lower one of the transistor pairs Tr2, Tr4, and Tr6. On the other hand, as a normal route, the output end of each comparator 35 is directly connected to upper one of the transistor pairs Tr1, Tr3, and Tr5 of each inverter arm of ARM1, ARM2, and ARM3. Furthermore, in FIG. 4B, drive pulse generator 32 generates the drive pulse by comparing signal wave 36 with triangular wave 37 generated from triangular wave generator at each comparator 38. It is noted that the output end of each comparator 35 is provided with each inverter INV4, INV5, and INV6 to invert an output voltage level of the corresponding comparator 35 to supply the inverted output voltage level to lower one of the transistor pairs TrTr8, Tr10, and Tr12. On the other hand, as the normal route, the output end of each comparator 35 is directly connected to upper one Tr7, Tr9, and Tr11 of the transistor pairs of inverter arms ARM4, ARM5, and ARM6.

It is noted that it is not necessary to consider a phase deviation (viz., synchronization) between triangular waves 34 and 37. In extreme cases, even if the phase is deviated by 180 [deg] with each other or if a jitter occurs on either of the triangular waves 34 or 37 due to some cause, an unnecessary current does not flow and a loss in signal or worsening of signal is not introduced.

Figure 5A:
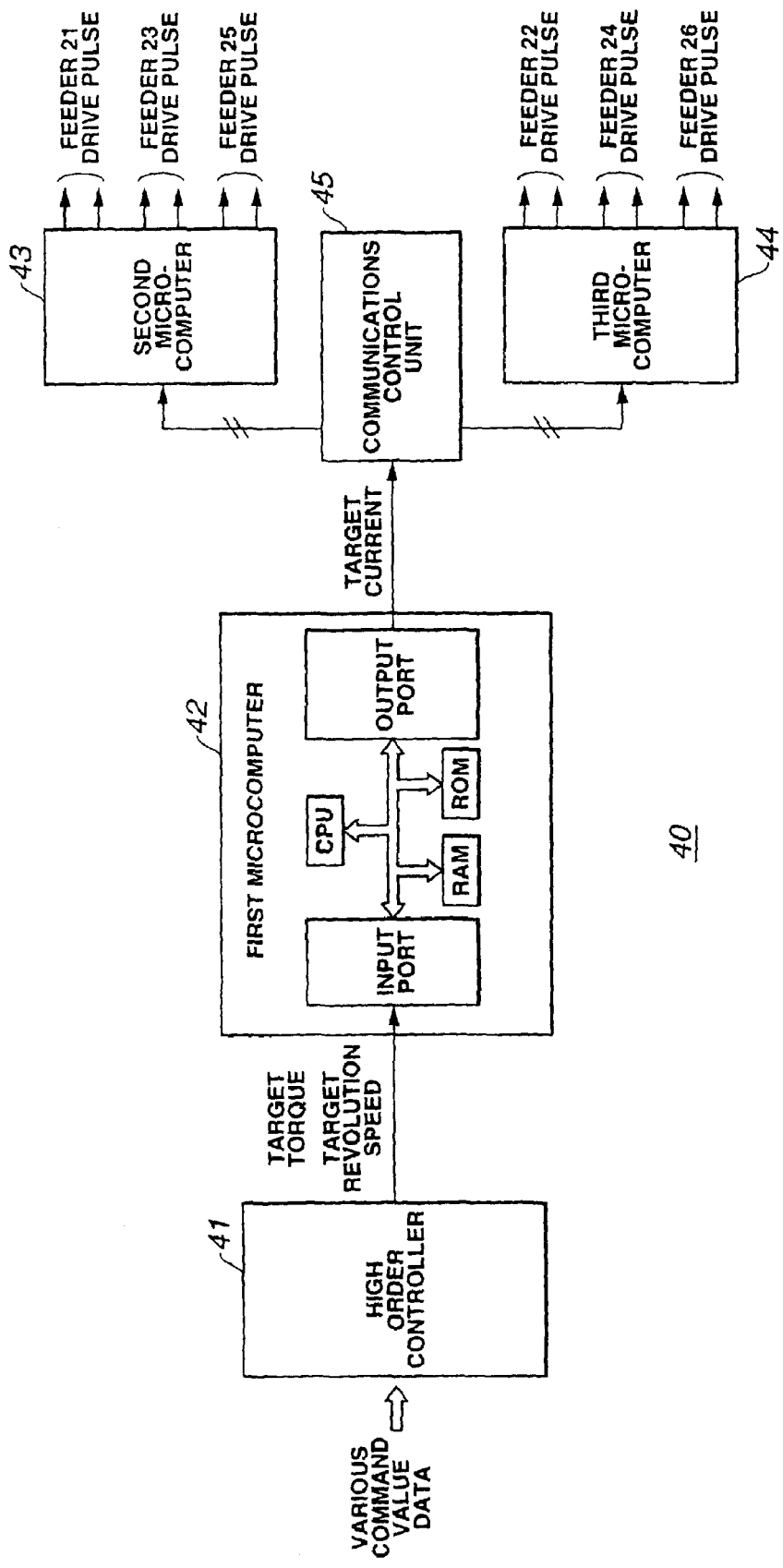
FIG. 5A is a functional block diagram of an example of a driving system which achieves the driving method for the electrical rotating machine according to the present invention.

Next, FIG. 5A shows a block diagram of a drive system for the electrical rotating machine according to the present invention is applicable.

In FIG. 5A, the connections to the stator coils of electrical rotating machine 100 corresponds to the latter example of FIGS. 3A and 3B.

Drive system 40 receives a target torque and a target revolution speed from a high order controller 41. Drive system 40 includes: a first microcomputer 42 generating a current command value; a second microcomputer 43 generating the drive pulses; a third microcomputer 44 generating the drive pulses for feeders 21, 23, and 25; and a communications control unit 45 which serves to communicate with first microcomputer and second and third microcomputers 42, 43, and 44. Each of first, second, and third microcomputers 42, 43, and 44 generally includes a CPU (Central Processing Unit), ROM (Read Only Memory), RAM (Random Access Memory), Input Port, Output Port, and a common bus. High order controller 41 may be incorporated into first microcomputer 42. The target torque and the target revolution speed are inputted to first microcomputer 42. First microcomputer 42 generates a target current value to reach to the target torque and the target revolution speed. Next, the generated target current value is supplied to communications control unit 45. Second and third microcomputers 43 and 44 retrieves the target current value from communications control unit 45. It is noted that it cannot be guaranteed that the target current value which is retrieved from communications control unit 45 has not always the same value at the same time point with a problem of data access time taken into consideration. Second and third microcomputers 43 and 44 generate the drive pulses using independent triangular wave and the target current value, as shown in FIG. 5A. The generated drive pulses are supplied to corresponding gate terminals of respective pairs of switching transistors of inverter INV (refer to FIG. 5B). Since second and third microcomputers 43 and 44 are independently operated of each other, six-phase corresponding comparators are not needed to be attached to each of second and third microcomputers 43 and 44. Consequently, a general purpose microcomputer can be used for each of second and third microcomputers 43 and 44 with easiness in installation, at a relatively low manufacturing cost, and with a reliability maintained appropriately.

Figure 6:
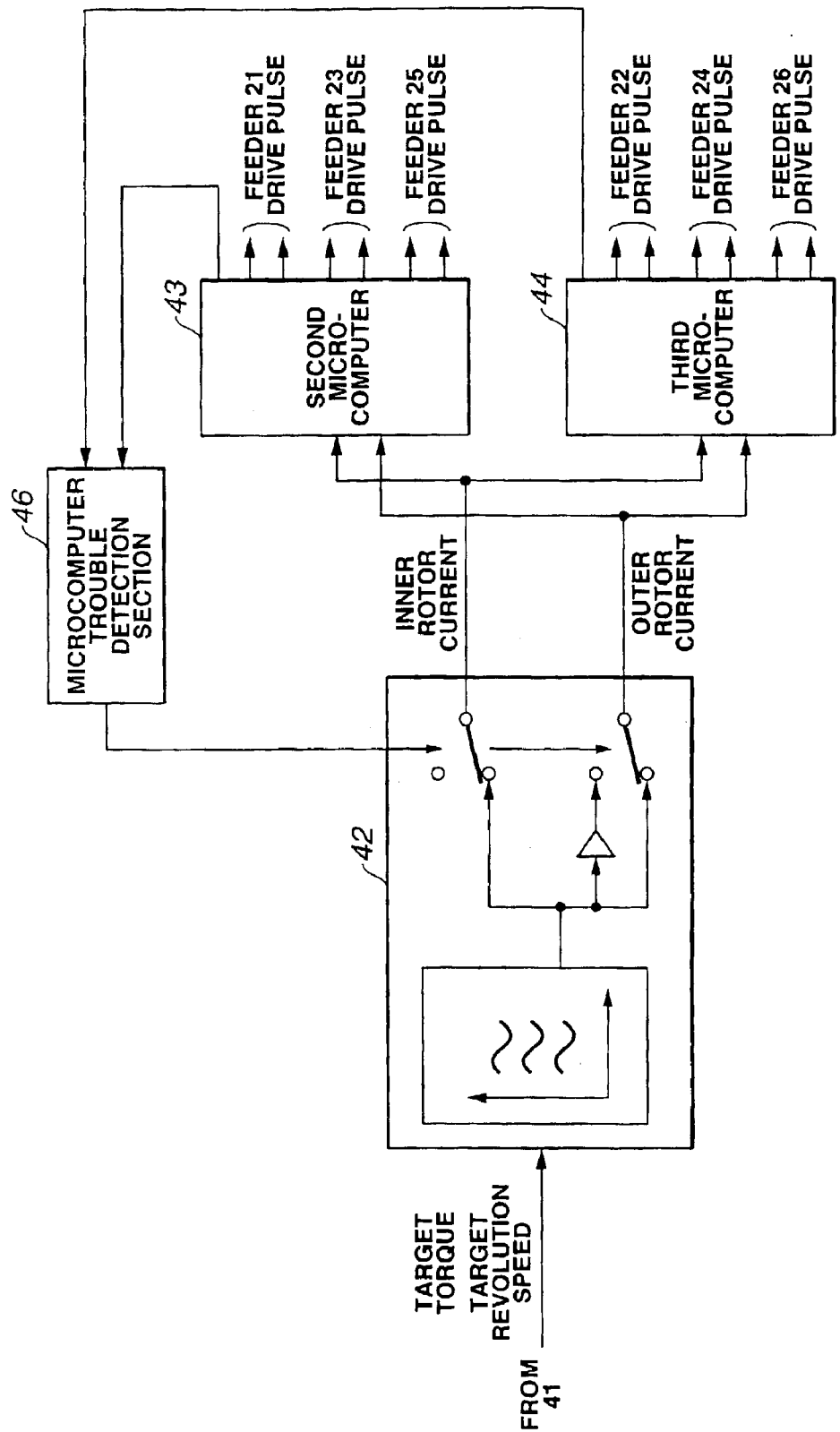
FIG. 6 is a variation of the circuit block diagram of the driving system which achieves the driving method for the electrical rotating machine and in which a microcomputer trouble countermeasure is carried out.

FIG. 6 shows a block diagram of the drive system for the electrical rotating machine according to the present invention. In FIG. 6, a microcomputer trouble detecting section 46 is installed for a countermeasure of a trouble when either one of second or third microcomputer has troubled (or a thermal runaway of its CPU occurs in either second or third microcomputer 43 or 44). The other structure except communications control unit 45 (omitted in FIG. 6) is generally the same as that shown in FIG. 5A. Suppose, as an example, that second microcomputer 43 has troubled. In a case where, for inner rotor 7 of the rotating machine 100, one pole pair configuration is constituted and for outer rotor 8, two pole pair configuration is constituted, a single microcomputer constituting only third microcomputer 44 cannot apparently generate the drive pulses for inner rotor 7 for which one pole pair is constituted. Hence, if microcomputer trouble detecting section 46 detects the trouble of second microcomputer 43, first microcomputer 42 does not output the ordinary target current value but zeroes inner rotor current command value and outputs the target current value whose outer rotor current command value is twice the ordinary current command value to third microcomputer 44 via communications unit 45.

At this time, although inner rotor 7 generation the torque is zeroed, the desired torque can be generated only by means of outer rotor 8. Hence, even if one of the microcomputers generating the drive pulses is troubled (a runaway of the one of the microcomputers occurs), the respective microcomputers generates the drive pulses independently of each other so that the desired torque can be generated using the normally operating microcomputer. For example, if the drive system shown in FIG. 6 is applied to an automotive vehicle, the vehicle can continue to run.

It is noted that FIG. 2B shows a variation of the three-phase, four pole pair configuration for outer rotor 8 and FIG. 2C shows a variation of the six-phase, two pole pair configuration for inner rotor 7. In a previously proposed three-phase, four pole pair stator configuration, a three-phase current having each phase difference of 120° is caused to flow from feeders 11, 12, and 13 to a first neutral point $N_1$ shown in FIG. 2B, from feeders 14, 15, and 16 to a second neutral point $N_2$, from feeders 20, 21, and 22 to a third neutral point $N_3$, and from feeders 17, 18, and 19 to a fourth neutral point $N_4$. In this configuration, each neutral point $N_1$ through $N_4$ is zeroed.

On the other hand, in the previously proposed six-phase, two pole pair stator configuration, a line (1) from feeder 11 is connected via a line (3) to feeder 13, a line (2) from feeder 12 is connected via a line (4) to feeder 14, a line (5) from feeder 15 is connected via a line (7) to feeder 17, a line (6) from feeder 16 is connected to a line (8) to feeder 18, a line (9) from feeder 19 is connected via a line (11) to feeder 21, and a line (10) from feeder 20 is connected via a line 12 to feeder 22. In this stator coil configuration, the six-phase current flows through each of stator coil L for each of phase of 60 degrees. It is noted that a minus sign attached to the phase angle means a counterclockwise direction as viewed from FIGS. 3B and 3C. At this time, if the three-phase current flows from feeder 11, the phase at feeder 13 indicates −240° which corresponds to −120° in the case of the phase of the six-phase current. If the three-phase current having the phase of −60° flows from feeder 12, the phase at feeder 180° in the case of the phase of the six-phase current. If the three-phase current having the phase of −240° flows from feeder 15, the phase at feeder 17 indicates 0° which corresponds to 0° in the case of the six-phase current. If the three phase current having the phase of −300° flows from feeder 15, the phase at feeder 18 indicates −120° which corresponds to −60° in the case of the six-phase current. If the three-phase current having the phase of −120° flow from feeder 19, the phase at feeder 21 indicates −120° which corresponds to −240° in the case of the six-phase current. If the three-phase current having the phase of −180° flows from feeder 20, the phase at feeder 22 indicates −240° which corresponds to −300° in the case of the six-phase current. Thus, the six-phase, two pole pair configuration of stator coils for inner rotor 7 having no interference against the three-phase, four pair pole configuration of stator coils for outer rotor 8 can be assembled. Then, a twelve-phase compound current which is the sum of the above-described six-phase and three-phase currents is caused to flow through each stator coil shown in each of FIGS. 3B and 3C.

However, in the driving method according to the present invention, in the case of the three-phase, four pole pair configuration for inner rotor shown in FIG. 2B, the stator coils related to twelve feeders 11 through 22 are divided into two groups, a current sum of each group being zeroed. Although one group of the stator coils related to feeders 11 through 16 has two neutral points of $N_1$ and $N_2$, these neutral points $N_1$ and $N_2$, are interconnected. In the case of the six-phase, two pole pair configuration for inner rotor 7 shown in FIG. 2C, lines (1) through (6) related to the one group of stator coils L related to feeders 11 through 16 are interconnected and lines (7) through (12) related to the other group of stator coils related to feeders 17 through 22 are interconnected. This means that the neutral points belonging to each group are interconnected. Consequently, the stator coil configuration for the three-phase four pole pair configuration shown in FIG. 2B is exactly the same as that for the six-phase two pole pair configuration shown in FIG. 2C.

Next, it is also noted that FIG. 3B shows a variation of the three-phase two pole pair stator coil configuration. It is noted that FIG. 3B also shows a variation of the six-phase one pair pole stator coil configuration. If the three-phase having the phase of 0° flows through stator coil L from feeder 21, the current having the phase of −240° flows from feeder 23, and the current having the phase of −120° flows from feeder 25, an outer rotor rotating magnetic field is generated with a current sum at one neutral point $N_B$ zeroed. If the three-phase current having the phase of 0° flows from feeder 24, the current having the phase of −120° flows from feeder 22, and the current having the phase of −240° flows from feeder 26. Hence, the stator coil configuration of FIG. 3B generates the outer rotor rotating field with the current sum of another neutral point $N_A$ zeroed. On the other hand, in the case of a previously proposed six-phase one pole pair stator coil configuration, the neutral point $N_A$ is interconnected to the other neutral point $N_B$. Then, for example, the six-phase current is caused to flow from feeder 11 to feeder 22 for each 60° to generate the rotating field for inner rotor 8. In the driving method according to the present invention, the stator coils related to six feeders 21, 22, 23, 24, 25, and 26 shown in FIGS. 3A and 3B are divided into two groups in the case of the six-phase one pole pair stator coil configuration for inner rotor 7. One group of stator coils related to feeders is constituted by stator coils related to feeders 21, 23, and 25. The current sum of this group of stator coils related to feeders 21, 23, and 25 is zeroed at neutral point $N_B$. The other group of stator coils related to feeders is constituted by those related to feeders 22, 24, and 26. The current sum of this group of feeders 22, 24, and 26 is zeroed at neutral point $N_A$. In this way, the neutral point in the case of the six-phase one pole pair stator coil configuration is separated into two neutral points $N_A$ and $N_B$. The three-phase two pole pair stator coil configuration shown in FIG. 3B is exactly the same as the six-phase one pair pole stator coil configuration shown in the same drawing.

It is also noted that FIG. 3A indicates that the number of stator coils are twelve in the same way as those shown in FIG. 2A and the stator coils connected to, for example, the same feeders 21 are two, in other words, the stator coil of the same phase are serially connected to form a single stator coil (as appreciated from FIGS. 3A and 3B), that is to say, the same numbered feeders 21, 22, 23, 24, 25, and 26 shown in FIG. 3A are connected to the two serially connected stator coils to form a single stator coil L.

Figure 5B:
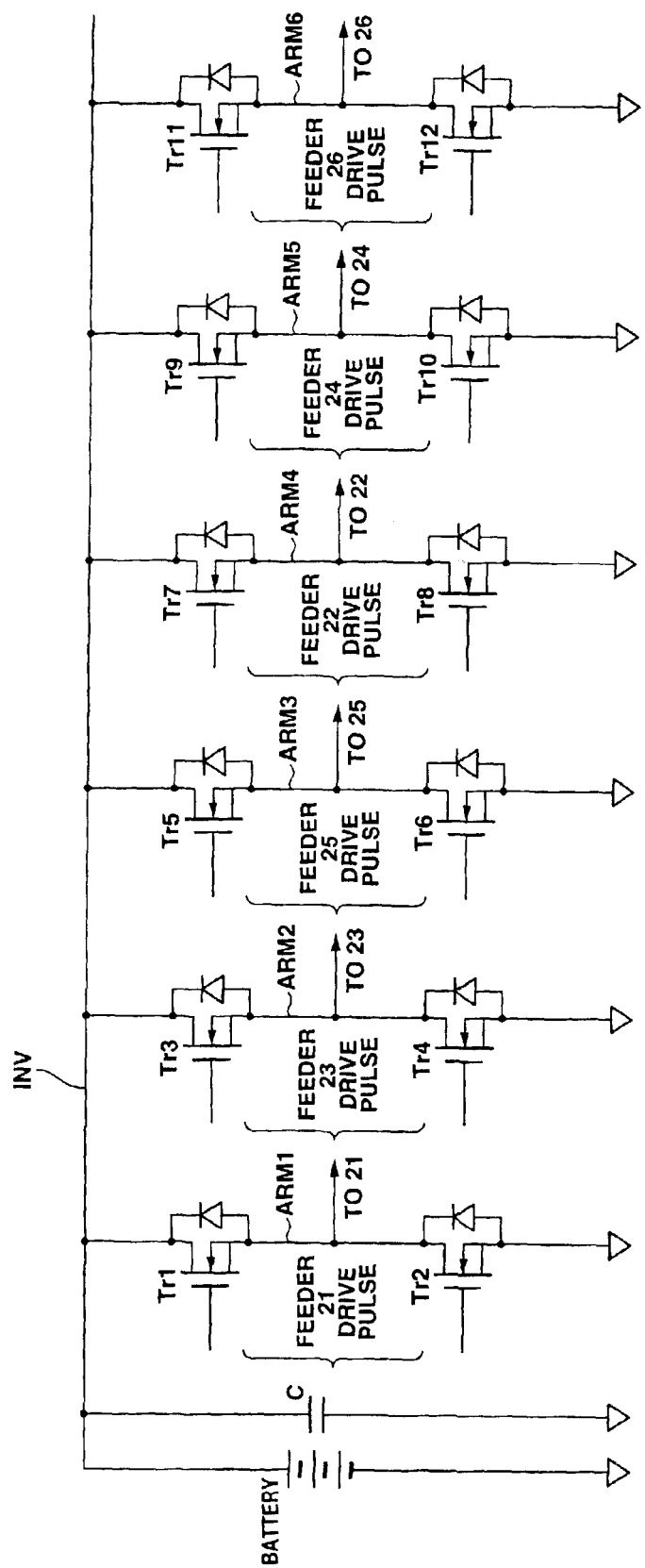
FIG. 5B is a circuit block diagram of a six-phase inverter applied to the driving system shown in FIG. 5A.

It is, furthermore, noted that, although drive pulse generators 31 and 32 are described as if they are discrete circuits, drive pulse generators are incorporated into respective second and third microcomputers 43 and 44, if microcomputer trouble detecting section 46 detects the trouble in second microcomputer 43, a switch described in first microcomputer 42 is transferred from a turn on state described in FIG. 6 to a turn of f state so that outer rotor current is amplified in the way described above with reference to FIG. 6, C shown in FIG. 5B denotes a capacitor, signal waves 33 and 36 may represent the target current value for the respective rotors, and the details of the compound current is exemplified by a U.S. Pat. No. 6,049,152 issued on Apr. 11, 2000 (the disclosure of which is herein incorporated by reference).

The entire contents of a Japanese Patent Application No. 2002-098246 (filed in Japan on Apr. 1, 2002) are herein incorporated by reference. Various changes and modifications can be made by those skilled in the art without departing from the scope of the present invention. The scope of the present invention is defined with reference to the following claims.

TABLE 1

|  | INNER ROTOR | OUTER ROTOR |
|---|---|---|
| FEEDER 11 | 0 | 0 |
| FEEDER 12 | −60 | −120 |
| FEEDER 13 | −120 | −240 |
| FEEDER 14 | −180 | 0 |
| FEEDER 15 | −240 | −120 |
| FEEDER 16 | −300 | −240 |
| FEEDER 17 | 0 | 0 |
| FEEDER 18 | −60 | −120 |
| FEEDER 19 | −120 | −240 |
| FEEDER 20 | −180 | 0 |
| FEEDER 21 | −240 | −120 |
| FEEDER 22 | −300 | −240 |
|  | (degrees) | (degrees) |

TABLE 2

|  | INNER ROTOR | OUTER ROTOR |
|---|---|---|
| FEEDER 21 | 0 | 0 |
| FEEDER 22 | −60 | −120 |
| FEEDER 23 | −120 | −240 |
| FEEDER 24 | −180 | 0 |
| FEEDER 25 | −240 | −120 |
| FEEDER 26 | −300 | −240 |

What is claimed is:

1. A driving method for an electrical rotating machine, the electrical rotating machine comprising two rotors, each rotor being independently driven by means of a compound current generated by a multi-phase inverter, and a stator on which a plurality of stator coils are wound, the driving method comprising: dividing the respective stator coils into a plurality of groups thereof, a total current sum of each group thereof being zeroed and neutral points of the stators belonging to the respective groups being interconnected; and supplying drive pulses to a plurality of inverter arms of the multi-phase inverter associated with one group of the stator coils independently of those supplied to other inverter arms of the multi-phase inverter associated with the other group of the stator coils.

2. A driving method for an electrical rotating machine as claimed in claim 1, wherein the stator has the stator coils whose number is twice as the number of phases of the multi-phase inverter and wherein two of the stator coils related to the same phases are serially connected to form a single stator coil.

3. A driving method for an electrical rotating machine as claimed in claim 1, wherein the drive pulses supplied to the respective inverter arms of the multi-phase inverter are generated by a PWM method, a PWM modulated wave or signal wave and a PWM modulation being independent for each inverter arm.

4. A driving method for an electrical rotating machine as claimed in claim 1, wherein one microcomputer generates the drive pulses supplied to the respective inverter arms of the multi-phase inverter associated with one group of the stator coils and another microcomputer generates the drive pulses supplied to the remaining inverter arms of the multi-phase inverter associated with the other group thereof independently of the one microcomputer.

5. A driving method for an electrical rotating machine as claimed in claim 4, wherein each microcomputer generates the drive pulses which achieve a target current value received from a high order calculating section.

6. A driving method for an electrical rotating machine as claimed in claim 5, wherein the driving method further comprises: detecting whether any function of either of the one or other microcomputer has troubled; and modifying the drive pulses generated from a normally operated microcomputer in such a manner that the generated drive pulses achieve a total current sum of the target current value derived from a high order calculating section when detecting that any function of either the one or the other microcomputer has troubled.

7. A driving method for an electrical rotating machine as claimed in claim 1, wherein the one group of the stator coils are connected to the corresponding inverter arms of the multi-phase inverter via related feeders and the other group of the stator coils are connected to the remaining inverter arms via the remaining related feeders.

8. A driving system for an electrical rotating machine, the electrical rotating machine comprising two rotors, each rotor being independently driven by means of a compound current generated by a multi-phase inverter, and a stator on which a plurality of stator coils are wound, the driving system comprising: a dividing section that divides the respective stator coils into a plurality of groups thereof, a total current sum of each group thereof being zeroed and neutral points of the stators belonging to the respective groups being interconnected; and a drive pulse supplying section that supplies drive pulses to a plurality of inverter arms of the multi-phase inverter associated with one group of the stator coils independently of those supplied to other inverter arms of the multi-phase inverter associated with the other group of the stator coils.

9. A driving system for an electrical rotating machine as claimed in claim 8, wherein the driving system further comprises PWM wave generators that generates the drive pulses supplied to the respective inverter arms of the multi-phase inverter by a PWM method, a PWM modulated wave or signal wave and a PWM modulation being independent for each inverter arm.

10. A driving system for an electrical rotating machine as claimed in claim 8, wherein the driving system further comprises one microcomputer that generates the drive pulses supplied to the respective inverter arms of the multi-phase inverter associated with one group of the stator coils and another microcomputer generates the drive pulses supplied to the remaining inverter arms of the multi-phase inverter associated with the other group thereof independently of the one microcomputer.

11. A driving system for an electrical rotating machine as claimed in claim 10, wherein each microcomputer generates the drive pulses which achieve a target current value received from a high order calculating section.

12. A driving system for an electrical rotating machine as claimed in claim 10, wherein the driving system further comprises: a trouble detecting section that detects whether any function of either of the one or other microcomputer has troubled; and a modifying section that modifies the drive pulses generated from a normally operated microcomputer in such a manner that the generated drive pulses achieve a total current sum of the target current value derived from a high order calculating section when the trouble detecting section detects that any function of either of the one or other microcomputer has troubled.

13. A driving system for an electrical rotating machine, the electrical rotating machine comprising two rotors, each rotor being independently driven by means of a compound current generated by a multi-phase inverter, and a stator on which a plurality of stator coils being wound, the driving system comprising: dividing means for dividing the respective stator coils into a plurality of groups thereof, a total current sum of each group thereof being zeroed and neutral points of the stators belonging to the respective groups being interconnected; and drive pulse supplying means for supplying drive pulses to a plurality of inverter arms of the inverter associated with one group of the stator coils independently of those supplied to other inverter arms of the inverter associated with the other group of the stator coils.

* * * * *